Feb. 25, 1958      A. A. HUMBY      2,824,743
FERTILIZER APPLICATOR DEVICE
Filed Jan. 12, 1956
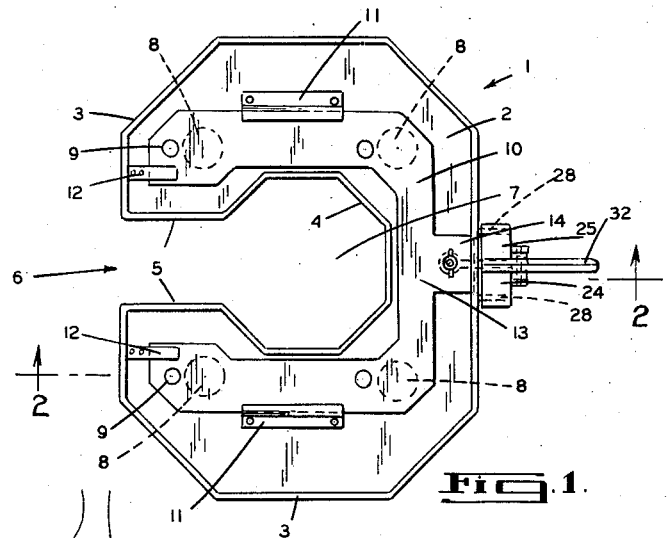
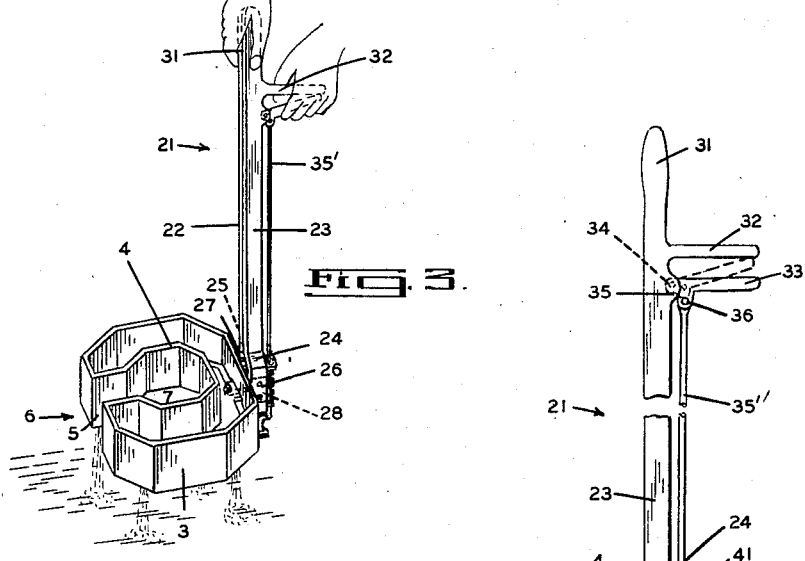
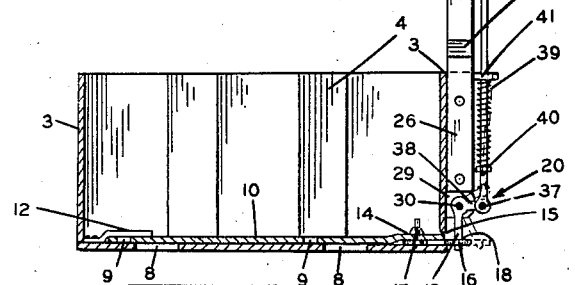
INVENTOR
ANNE ALBERTA HUMBY
ATTY.

United States Patent Office 2,824,743
Patented Feb. 25, 1958

2,824,743

FERTILIZER APPLICATOR DEVICE

Anne A. Humby, Victoria, British Columbia, Canada

Application January 12, 1956, Serial No. 558,776

7 Claims. (Cl. 275—11)

This invention relates to a fertilizer applicator for distributing fertilizer around a plant or plants, evenly and in controlled amounts.

At the present time in the field of agriculture and horticulture there is widespread use of chemical fertilizers which are granular or powdered and free flowing. Since these chemical fertilizers have a tendency to burn or destroy the plants if contacted with the fertilizer, the fertilizer must be applied to the earth surrounding the plants. In small gardens the common method of applying this fertilizer is by hand which it is readily appreciated is not only objectionable because of the handling of the fertilizer but extremely fatiguing also. It is therefore the principal object of this invention to provide a fertilizer applicator for use in small gardens or the like where the known fertilizer dispensing devices would be unsuitable.

More particularly the object of this invention is to provide a fertilizer applicator which can be easily transported and operated by a single person at his leisure.

Another object of this invention is to provide a fertilizer applicator which can dispense fertilizer in spaced relation to a plant or plants and in which the amount of fertilizer distributed can be controlled.

It is another object of this invention to provide a fertilizer applicator which has lightness of weight, simplicity of construction and operation enhancing its utility as a garden implement.

Again it is another object to provide a fertilizer applicator which can be manufactured at low cost.

The principal feature of the invention resides in the provision of a fertilizer container which is formed to define a central plant receiving opening whereby the container can be placed in a position substantially surrounding the plant or plants.

More particularly a feature of the invention resides in the provision of a container having a generally C-shaped bottom and correspondingly shaped inner and outer walls, the open side of the C-shaped container affording an entrance to the central open part whereby the stock or stem of the plant can be placed in the central opening of the container in which position the container substantially surrounds the stock or stem of the plant.

Another feature of the invention resides in the provision of spaced apertures formed in the bottom of a fertilizer container to distribute fertilizer at spaced points about the plant.

Another feature of the invention resides in the provision of a C-shaped slide carried by the bottom of the container, the C-shaped slide having apertures formed therein adapted to register with the apertures formed in the bottom of the container in the open position.

Another feature of the invention resides in the provision of a handle of a length which enables the operator to stand upright while applying fertilizer to the various plants in his garden.

Other objects and features of the invention will become apparent in the following description of the device read in conjunction with the accompanying sheet of drawings.

With reference to the drawings;

Figure 1 is a plan view of the fertilizer applicator showing the form of the container and the details of the slide;

Figure 2 is a vertical part-sectional view taken along the line 2—2 of Figure 1 of the fertilizer applicator;

Figure 3 is a perspective view of the device showing the fertilizer applicator being operated to dispense fertilizer.

With reference to Figure 1, the fertilizer applicator device comprises a container generally designated by 1 having a generally C-shaped bottom 2 and correspondingly generally C-shaped outer walls 3 and inner walls 4. In the drawings the outer walls 3 and inner walls 4 have a somewhat octagonal configuration whereas it is pointed out the walls might very well be part annular or form the sides of a square. In the drawings applicant shows the outer walls 3 and inner walls 4 to be made from a continuous piece of material whereas the walls could be fabricated from separate pieces. For the sake of clarity, the portions 5 of the walls may be termed the end portions 5 defining an entrance 6 into the central plant receiving opening 7 defined by the inner walls 4.

Formed in the bottom of the container 2 are passages or apertures 8 through which fertilizer placed in the container flows when the corresponding apertures 9 formed in a C-shaped slide member 10 are in registration with apertures 8. The C-shaped slide member 10 is carried on the bottom 2 of the container 1 and is in slidable engagement therewith. Maintaining the slide 10 in engagement with the bottom 2 of the container 1 are plates 11 which are secured to the bottom 2 which also guide the movement of the C-shaped slide member 10. Also mounted on the bottom of the container 1 at the outer ends of the C are stop members 12 which limit the movement of the C-shaped slide member forwardly.

Intergral with the C-shaped slide member in the central portion 13 of the C-shaped slide is an offset tongue or lug 14 which extends through an opening 15 in the outer wall 3 adjacent the bottom which is best seen in Figure 2. A bar 16 is attached to the tongue or lug 14 by a bolt and wing nut 17 or other suitable means. The bar 16 extends through and beyond the wall 3 of the container and is formed with an opening therein 18 to receive one end 19 of a bell crank 20.

The handle 21 formed from two bars 22 and 23 are each bent as at 24 and 25 to form a Y or yoke as best seen in Figure 3. The portions 26 and 27 of the Y are riveted to projections 28, the projections 28 being welded or in some manner secured to the wall 3 of the container. A lug 29 secured to the wall 3 of the container below the handle 21 supports a pivot 30 for the bell crank 20.

At the upper end of the handle 21 a hand gripping portion 31 is formed for supporting and steadying the device when being operated as shown in Figure 3. A hand gripping portion 32 is formed at the upper end of the handle 21 for gripping a lever 33 which is pivoted at 34 on a lug 35 which is integral with the handle 21. A link 35' is pivoted as at 36 to the handle lever 33 and at 37 to the arm 38 of the bell crank 20.

A coiled spring 39 carried by the link 35' is secured to the link 35' adjacent its lower end by means of a nut 40, the upper end of the spring 39 being seated against the projection 41 which is mounted between the yoke portions 26 and 27 of the handle 21.

As best seen in Figures 2 and 3, the operation of the fertilizer applicator is as follows:

The handle portion 31 is gripped with one hand while the hand gripping portion 32 is gripped with the other, the fingers of the latter hand engaging the lever 33 moving it upwardly against the handle gripping portion 32 whereupon the link 35 is moved upwardly compressing the spring 39 and rotating the bell crank 20 to the dotted position shown in Figure 2. The slide 10 through member 16 is moved rearwardly registering the apertures 9 formed therein with the apertures 8 formed in the bottom of the container. Upon the release of the lever 33, the spring 39 urges the linkage 33, 35' and 20 to initial position moving the slide forwardly against the stops 12, closing the apertures, 8.

It is pointed out that the size of the apertures 9 in the C-shaped slide 10 may be varied according to the type of fertilizer used, the slide being easily replaced by another having larger or smaller diameter apertures.

It will be understood that the particular applicator shown and described herein is merely illustrative of the invention and various modifications in details of construction and arrangement of parts may be made without departing from the scope of the invention as set forth in the appended claims.

What I claim as my invention is:

1. A fertilizer applicator comprising a container having a C-shaped configuration adapted to surround a plant and having a bottom, side and end walls, said bottom being formed with a plurality of passages therethrough, means carried by said bottom wall and in sliding engagement therewith and being slidable transversely thereof for closing and opening said passages and a handle for said container.

2. A fertilizer applicator comprising a container for fertilizer having a C-shaped bottom, inner and outer C-shaped side walls, and end walls completing the open end of said C between the inner and outer C-shaped walls, said bottom being formed with passages therethrough, slide means carried by said C-shaped bottom wall of said container and being slidable transversely thereof, for closing and opening said passages and a handle for said container.

3. A fertilizer applicator comprising a container for fertilizer having a substantially C-shaped bottom defining a central plant receiving opening therein, side walls carried by said bottom wall to define a container substantially surrounding said central opening, said bottom being formed with passage means therethrough and slide means carried by said bottom and being slidable transversely thereof, for closing and opening said passage means, and a handle for said container.

4. A fertilizer applicator comprising a container for fertilizer having a generally C-shaped bottom wall and continuous side walls, said bottom being formed with a plurality of apertures therethrough, slide means carried by said bottom and being slidable transversely thereof, for closing and opening said apertures and a handle for said container.

5. A fertilizer applicator according to claim 4 in which said slide means is C-shaped, said slide means being operable by linkage means carried by said handle, and means carried by said linkage means normally urging said linkage means to move said slide means into the closed position.

6. A fertilizer applicator comprising a container for fertilizer adapted to substantially surround a plant and having a generally C-shaped bottom, continuous inner and outer C-shaped side walls and end walls bridging the ends of the C-shaped walls and bottom, said bottom having a plurality of apertures formed therethrough, a C-shaped slide means carried by said bottom for closing and opening said apertures, said slide means having apertures formed therethrough for registering with said apertures in said bottom, in the open position, a handle structure carried by said container, linkage means mounted on said handle structure in engagement with said slide means for moving said slide into the open position, and spring means acting on said linkage means to normally urge said slide means into the closed position.

7. A fertilizer applicator comprising a container having a central plant receiving opening substantially encircled by a part annular inner wall, a corresponding part annular outer wall, a part annular bottom forming the bottom of the container, and end walls closing the open ends of said container, a part annular slide adapted to be carried by said bottom and be movable relative to said bottom, said bottom being formed with a plurality of apertures therethrough, said slide being formed with corresponding apertures for registering with said apertures in said bottom wall in the open position, a handle structure for said container, linkage means carried by said handle structure means operably connecting said slide means with said linkage means, and a lever carried by said linkage means for moving said linkage means, and said slide means, and spring means provided to normally urge said linkage means in a direction to maintain said slide means in the closed position.

References Cited in the file of this patent

UNITED STATES PATENTS

| 633,244 | Labelle | Sept. 19, 1899 |
| 1,339,256 | Browning | May 4, 1920 |
| 1,877,982 | Schakel | Sept. 20, 1932 |
| 2,014,003 | McRae | Sept. 10, 1935 |
| 2,330,408 | Cover | Sept. 28, 1943 |